J. SLEPIAN.
CIRCUIT INTERRUPTER.
APPLICATION FILED DEC. 31, 1918.
1,323,327.
Patented Dec. 2, 1919.
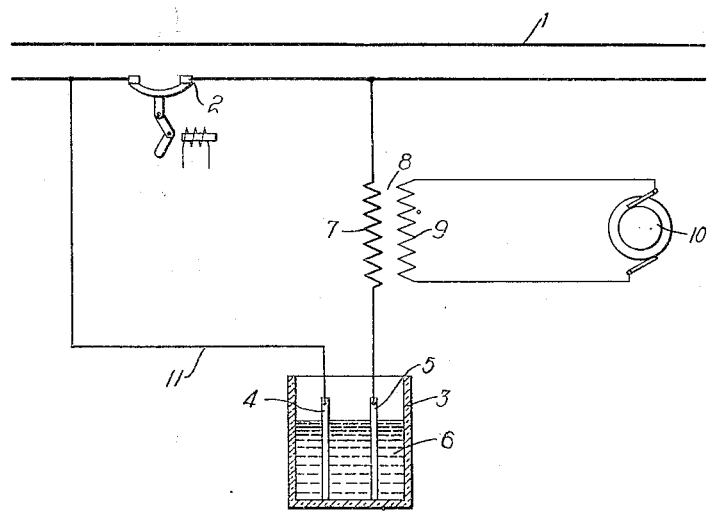
WITNESSES:
H. B. Funk
J. M. Procter
INVENTOR
Joseph Slepian
BY
Wesley G. Carr
ATTORNEY

UNITED STATES PATENT OFFICE.

JOSEPH SLEPIAN, OF WILKINSBURG, PENNSYLVANIA, ASSIGNOR TO WESTINGHOUSE ELECTRIC & MANUFACTURING COMPANY, A CORPORATION OF PENNSYLVANIA.

CIRCUIT-INTERRUPTER.

1,323,327.
Specification of Letters Patent.
Patented Dec. 2, 1919.

Application filed December 31, 1918. Serial No. 269,101.

*To all whom it may concern:*

Be it known that I, JOSEPH SLEPIAN, a citizen of the United States, and a resident of Wilkinsburg, in the county of Allegheny and State of Pennsylvania, have invented a new and useful Improvement in Circuit-Interrupters, of which the following is a specification.

My invention relates to circuit interrupters and particularly to means for preventing arcing at the contact members thereof.

One object of my invention is to provide electrolytic means for absorbing the electromagnetic energy of a circuit when the circuit is interrupted.

Another object of my invention is to provide alternating-current means for so automatically breaking down the film of an electrolytic valve, when the interrupter with which it is associated is in its closed position, that it will function properly to dissipate the energy of the circuit when the interrupter is opened.

In practising my invention, I provide an electrolytic valve that is connected in series with the secondary winding of a transformer, the circuit, thus constituted, being connected in shunt relation to the circuit interrupter. The primary winding of the transformer is connected to a source of alternating current. When the interrupter is closed, sufficient rectified current traverses the cell to break down the film on the anode thereof, and it is maintained in such state in order to permit passage of direct current therethrough when the interrupter is opened.

The single figure of the accompanying drawings is a diagrammatic view of an electric circuit embodying my invention.

A direct-current circuit 1 is provided with a circuit interrupter 2 and an electrolytic valve cell 3 for dissipating the electromagnetic energy of the circuit when the interrupter 2 is opened.

The cell 3 comprises electrodes 4 and 5, preferably constructed of antimony, and a suitable electrolyte 6. The electrode 5 is connected to one terminal of the secondary winding 7 of a transformer 8 the primary winding 9 of which is connected to a source 10 of alternating current. The other terminal of the secondary winding 7 is connected to one terminal of the interrupter 2, and the other terminal of the interrupter 2 is connected to the electrode 4. With this arrangement, the valve 3 is normally connected in shunt relation to the interrupter 2 and thus serves as a bypass for the current traversing the circuit 1 when the interrupter 2 is opened.

In order to insure that the energy of the circuit may continue to flow when the interrupter 2 is opened, it is necessary that the film on the anode of the valve 3 shall be broken down. This is accomplished by a source 10 of alternating electromotive force which, when the interrupter 2 is closed, so induces a rectified current in the circuit 11 comprising the valve 3, that the film on the anode thereof is normally broken down.

When the interrupter 2 is opened, the current traversing the circuit 1 continues to flow through the valve 3 until a film is built up on the anode thereof which gradually chokes or dissipates the energy of the circuit and thus permits the interrupter 2 to be opened without arcing between the contact members thereof.

My invention is not limited to the particular structure illustrated, as it may be variously modified, within the spirit and scope of the invention, as set forth in the appended claims.

I claim as my invention:

1. In a direct-current circuit, the combination with a circuit interrupter, and an electrolytic valve connected in shunt relation thereto, of alternating-current means for breaking down the film on one of the electrodes when the interrupter is closed.

2. In a direct-current circuit, the combination with a circuit interrupter, and an electrolytic valve connected in shunt relation thereto, of means inductively related to the valve for breaking down the film thereof when the interrupter is in its closed position.

3. In a direct-current circuit, the combination with a circuit interrupter, and an electrolytic valve connected in shunt relation thereto, of a source of alternating current operatively connected to the valve for causing a rectified current to traverse the same to destroy the film only when the interrupter is in its closed position.

4. In a direct-current circuit, the combination with a circuit interrupter, and an electrolytic valve connected in shunt relation thereto, of a source of alternating current operatively connected to the valve for breaking down the film on one electrode thereof, under predetermined conditions.

5. In an electric circuit, the combination with a circuit interrupter, and an electrolytic valve connected in shunt relation thereto, of alternating-current means for causing the film of the valve to be broken down when the interrupter is in its closed position.

6. In a direct-current electric circuit, the combination with a circuit interrupter, and an electrolytic valve, of a source of alternating current, a transformer, the primary winding of which is connected to the source of alternating current and the secondary winding of which is connected in series with the valve, the partial circuit comprising the valve and the secondary winding of the transformer being connected in shunt relation to the interrupter.

7. In a direct-current electric circuit, the combination with a circuit interrupter and electrolytic means for absorbing the electromagnetic energy of the circuit when the interrupter is opened, of means for inherently assisting the breaking down of the film in the electrolytic means when the interrupter is in its closed position.

In testimony whereof, I have hereunto subscribed my name this 16th day of Dec., 1918.

JOSEPH SLEPIAN